US009120636B2

(12) United States Patent
Cavirani et al.

(10) Patent No.: US 9,120,636 B2
(45) Date of Patent: Sep. 1, 2015

(54) METHOD FOR MOVING A REEL OF PACKAGING MATERIAL FROM A STORAGE STATION TO A SUPPLY STATION OF A PACKAGING UNIT FOR PRODUCING SEALED PACKAGES OF FOOD PRODUCT, AND CLAMPING UNIT FOR CLAMPING SUCH REEL

(75) Inventors: Vittorio Cavirani, Traversetolo (IT); Paolo Ferrari, Sassuolo (IT)

(73) Assignee: TETRA LAVAL HOLDINGS & FINANACE S.A., Pully (CH)

( * ) Notice: Subject to any disclaimer, the term of this patent is extended or adjusted under 35 U.S.C. 154(b) by 1078 days.

(21) Appl. No.: 13/143,822

(22) PCT Filed: Apr. 27, 2010

(86) PCT No.: PCT/EP2010/055607
§ 371 (c)(1),
(2), (4) Date: Jul. 8, 2011

(87) PCT Pub. No.: WO2010/125051
PCT Pub. Date: Nov. 4, 2010

(65) Prior Publication Data
US 2011/0274527 A1 Nov. 10, 2011

(30) Foreign Application Priority Data
Apr. 29, 2009 (EP) ..................................... 09159101

(51) Int. Cl.
*B66F 9/18* (2006.01)
*B65H 19/12* (2006.01)
*B60P 3/035* (2006.01)

(52) U.S. Cl.
CPC ................ *B65H 19/12* (2013.01); *B60P 3/035* (2013.01); *B65H 2301/4173* (2013.01); *B65H 2301/4174* (2013.01); *B65H 2301/41722* (2013.01)

(58) Field of Classification Search
CPC .. B23Q 7/04; B23Q 7/1405; H01L 21/67781; H01L 21/68707; H01L 21/67742; B21D 43/10; B21J 15/32; B65G 47/847; B65G 7/08; G01N 35/0099; G11B 17/225; B60B 29/002; B60B 29/001; B64F 1/22; B64F 1/227; B60P 3/125; B60P 3/035; B62D 43/02; B62D 53/0857; B62D 43/007; B62D 43/002; B62D 43/04; B66F 9/18; B66F 9/12; B66F 9/061; B66F 9/06; B66F 9/184; B66F 9/125; B66F 9/183; B66F 9/187; B21C 47/24; A01D 87/127; B66C 1/54; B65H 19/126; B65H 2301/4173; B65H 2301/41722; B65H 2301/4174
USPC ............... 414/225.01, 226.02, 426, 427, 428, 414/429, 465, 607, 620, 621, 622, 684, 432, 414/911; 294/81.61, 81.21, 87.26, 207, 294/103.2, 119.1
See application file for complete search history.

(56) References Cited

U.S. PATENT DOCUMENTS 2,971,662 A * 2/1961 Dunham ........................ 414/420
3,409,156 A * 11/1968 Mills .............................. 414/607
(Continued)

FOREIGN PATENT DOCUMENTS

CN 1406819 A 4/2003
CN 1886318 A 12/2006
(Continued)

OTHER PUBLICATIONS

International Search Report (PCT/ISA/210) issued on Jul. 30, 2010, by European Patent Office as the International Searching Authority for International Application No. PCT/EP2010/055607.
(Continued)

*Primary Examiner* — Saul Rodriguez
*Assistant Examiner* — Glenn Myers
(74) *Attorney, Agent, or Firm* — Buchanan Ingersoll & Rooney PC

(57) ABSTRACT

A method for moving a reel of packaging material from a storage station to a supply station of a packaging unit involves clamping a peripheral edge of reel by using a pair of clamping elements of a clamping unit, rotating clamping elements relative to the reel, and supporting the reel on the pair of clamping elements by interacting with a portion of reel radially inner with respect to circumferential edge.

16 Claims, 7 Drawing Sheets

(56) References Cited

U.S. PATENT DOCUMENTS

| | | | |
|---|---|---|---|
| 3,511,263 A * | 5/1970 | Emke | 137/355.17 |
| 3,830,388 A * | 8/1974 | Mott | 414/429 |
| 3,860,193 A * | 1/1975 | Green | 242/557 |
| 3,937,413 A * | 2/1976 | Devine | 242/557 |
| 3,970,342 A * | 7/1976 | Cotton | 294/86.4 |
| 4,051,966 A * | 10/1977 | Cotton | 414/428 |
| 4,354,793 A * | 10/1982 | Perry | 414/546 |
| 4,447,012 A * | 5/1984 | Woodruff | 242/423.1 |
| 4,655,670 A * | 4/1987 | Hogberg et al. | 414/458 |
| 4,743,157 A * | 5/1988 | Takatsuki | 414/498 |
| 4,951,990 A * | 8/1990 | Hollan et al. | 294/119.1 |
| 5,219,127 A | 6/1993 | Boldrini et al. | |
| 5,249,757 A | 10/1993 | Draghetti et al. | |
| 5,474,251 A | 12/1995 | Neri | |
| 5,601,252 A | 2/1997 | Draghetti | |
| 5,618,377 A | 4/1997 | Kaneko et al. | |
| 6,276,628 B1 * | 8/2001 | Focke et al. | 242/559.1 |
| 6,829,835 B2 * | 12/2004 | Pfeil | 33/333 |
| 7,673,915 B1 * | 3/2010 | Fischer | 294/86.4 |
| 8,096,745 B2 * | 1/2012 | Lamothe | 414/428 |
| 8,459,926 B2 * | 6/2013 | Hedley et al. | 414/429 |
| 2003/0032538 A1 | 2/2003 | Spatafora et al. | |
| 2005/0074316 A1 * | 4/2005 | Hedley et al. | 414/426 |
| 2007/0102564 A1 | 5/2007 | Loffler et al. | |
| 2011/0280701 A1 * | 11/2011 | Brighenti et al. | 414/621 |

FOREIGN PATENT DOCUMENTS

| | | |
|---|---|---|
| DE | 90 17 476 U1 | 4/1992 |
| DE | 10 2006 014 532 A1 | 10/2007 |
| EP | 0 664 268 A2 | 7/1995 |
| EP | 0 994 057 A1 | 4/2000 |
| GB | 2 422 591 A | 8/2006 |
| JP | 59-057498 U | 4/1984 |
| JP | 2000-264507 A | 9/2000 |
| RU | 32754 U1 | 9/2003 |

OTHER PUBLICATIONS

Written Opinion (PCT/ISA/237) issued on Jul. 30, 2010, by European Patent Office as the International Searching Authority for International Application No. PCT/EP2010/055607.

Office Action (Reasons) issued on Feb. 25, 2014, by the Japanese Patent Office in corresponding Japanese Patent Application No. 2012-507712 and an English translation of the Office Action. (6 pages).

Office Action (First Office Action) issued on Oct. 31, 2013, by the Chinese Patent Office in corresponding Chinese Patent Application No. 201080018929.7, and an English Translation of the Office Action. (12 pages).

Decision to Grant issued Jul. 3, 2014, by the Russian Patent Office, in corresponding Russian Patent Application No. 2011148425, and English language translation of Office Action. (11 pages).

* cited by examiner

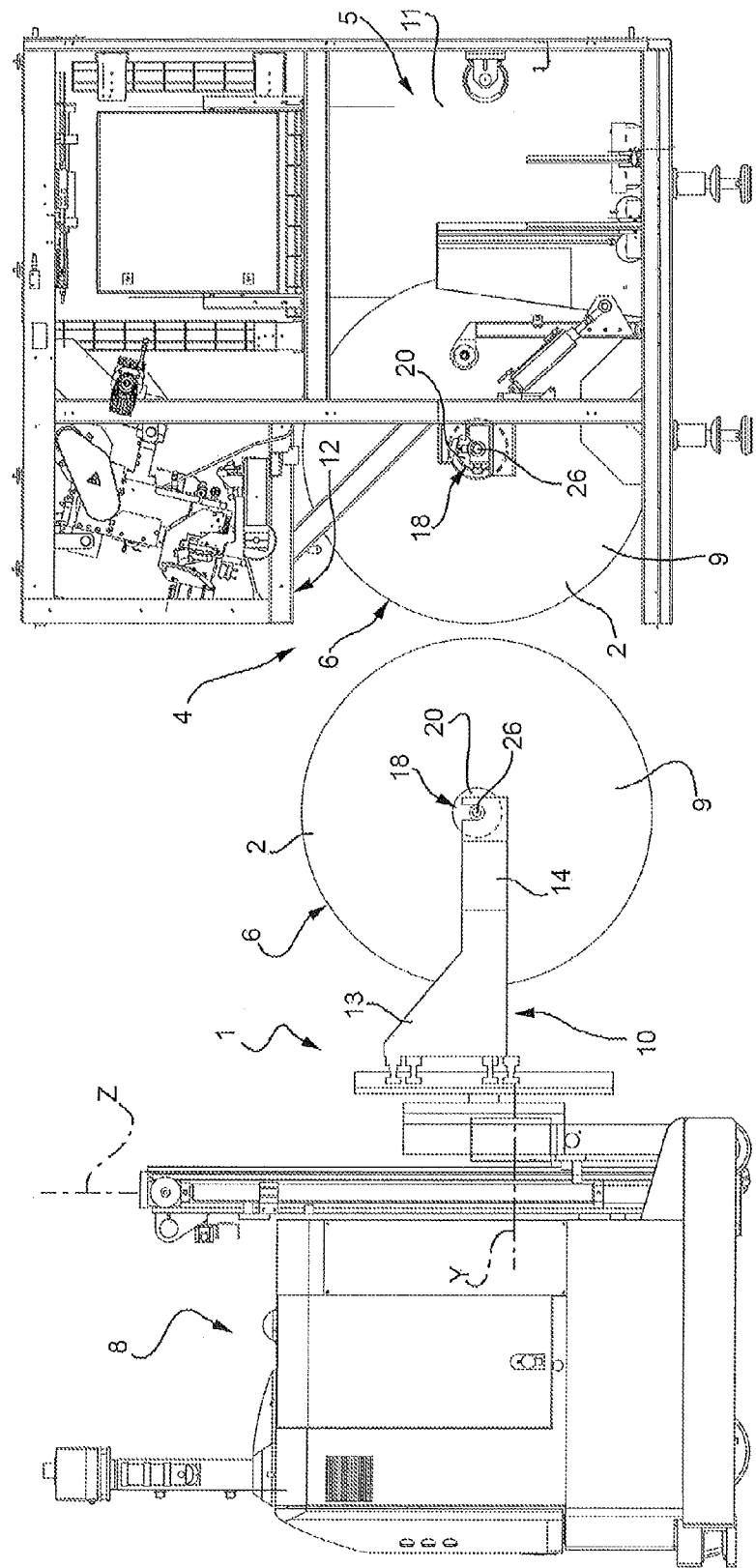

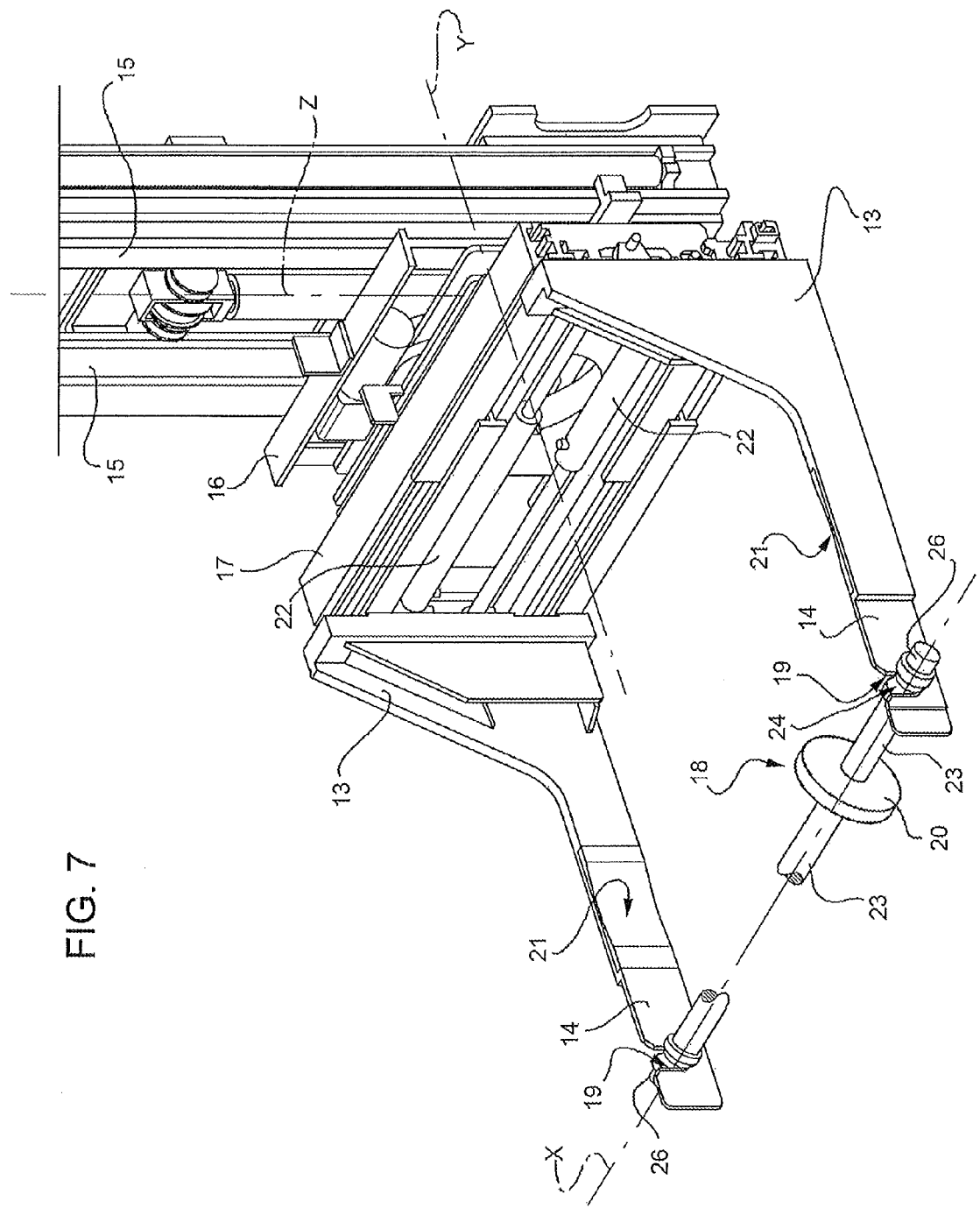

METHOD FOR MOVING A REEL OF PACKAGING MATERIAL FROM A STORAGE STATION TO A SUPPLY STATION OF A PACKAGING UNIT FOR PRODUCING SEALED PACKAGES OF FOOD PRODUCT, AND CLAMPING UNIT FOR CLAMPING SUCH REEL

TECHNICAL FIELD

The present invention relates to a method for moving a reel of packaging material from a storage station to a supply station of a packaging unit for producing sealed packages of food product.

Furthermore, the present invention relates to a clamping unit for clamping a reel of packaging material.

BACKGROUND ART

Many food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may be defined by a layer of fibrous material, e.g. paper, or mineral-filled polypropylene material; and a number of layers of heat-seal plastic material, e.g. polyethylene film, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging units having a supply station fed with reels of packaging material.

In particular, a continuous tube is formed from the web-fed packaging material in the packaging unit; the web of packaging material is sterilized in the packaging unit, e.g. by applying a chemical sterilizing agent such as a hydrogen peroxide solution, which is subsequently removed, e.g. by heating and evaporation, from the surfaces of the packaging material.

The sterilized web is maintained in a closed, sterile environment, and is folded into a cylinder and sealed longitudinally to form a tube.

The tube is fed in a first vertical direction parallel to its axis, is filled continuously with the sterilized or sterile-processed food product and is heat-sealed at equally spaced cross sections by two pairs of jaws to form pillow packs each having a top and a bottom transverse sealing band, i.e. a band extending along a second direction orthogonal to the first direction. Pillow packs are separated by cutting respective sealing bands and are then fed to a folding station, in which they are fold so as to form respective packages.

Reels of packaging materials are normally stored onto a pallet at the storage station and are subsequently taken from such pallet and loaded into the supply station of the packaging unit.

More precisely, a first manipulator takes the reel from the storage station and a second manipulator takes the reel having its axis along a horizontal direction and feeds the supply station with such reel. The second manipulator comprises a loading equipment to correctly arrange the reel inside the supply station of the packaging unit.

A need is felt within the industry to streamline as much as possible the taking of reels from the pallet and the subsequent loading of reels onto the supply station.

Furthermore, a need is felt within the industry to reduce as much as possible the risk of damaging the external layer of packaging material as the reel is loaded onto the supply station.

Finally, due to the restriction of space within the supply station, a need is felt within the industry to facilitate the loading of reels onto the supply station.

DISCLOSURE OF INVENTION

It is an object of the present invention to provide a method for moving a reel of packaging material and a clamping unit for clamping such reel of packaging material, designed to meet at least one of the above requirement in a straightforward, low-cost manner.

According to the present invention, there is provided a method for moving a reel of packaging material from a storage station to a supply station of a packaging unit for producing sealed packages of food product, as claimed in Claim 1.

The present invention also relates to a clamping unit for clamping a reel of packaging material, as claimed in claim 9.

BRIEF DESCRIPTION OF THE DRAWINGS

A preferred, non-limiting embodiment of the present invention will be described by way of example with reference to the accompanying drawings, in which: FIG. 6 is a lateral view in a reduced scale of the clamping unit of FIGS. 1 to 5 in a further operative position and of a supply station of a packaging unit; and FIG. 7 is perspective view of the clamping unit of FIGS. 1 to 6 when coupled with a spindle.

BEST MODE FOR CARRYING OUT THE INVENTION

Figure 1:
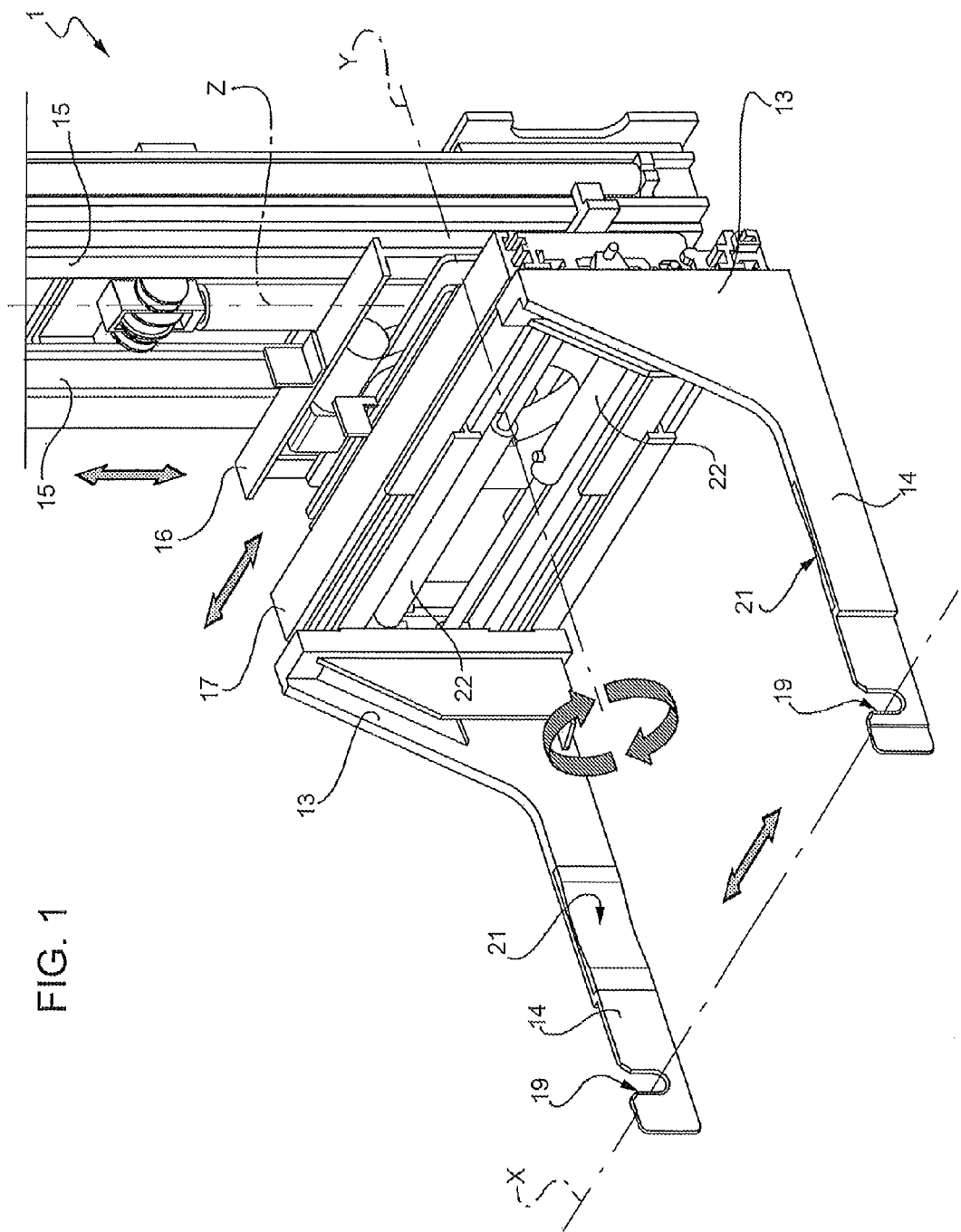
FIG. 1 is a perspective view of a clamping unit according to the present invention.

Number 1 in FIGS. 1 to 7 indicates as a whole a clamping unit for moving a reel 2 of packaging material from a storage station 3 (only schematically shown in FIG. 2) to a supply station 4 (FIG. 6) of a packaging unit 5 for producing sealed packages of food product from a tube of sheet packaging material.

In particular, reel 2 comprises an outer circumferential peripheral edge 6, a central through hole 7 radially inner with respect to peripheral edge 6, and a pair of head surfaces 9 opposite one another and extending from hole 7 to peripheral edge 6. Hole 7 is also coaxial to reel 2 (FIG. 2).

Figure 2:
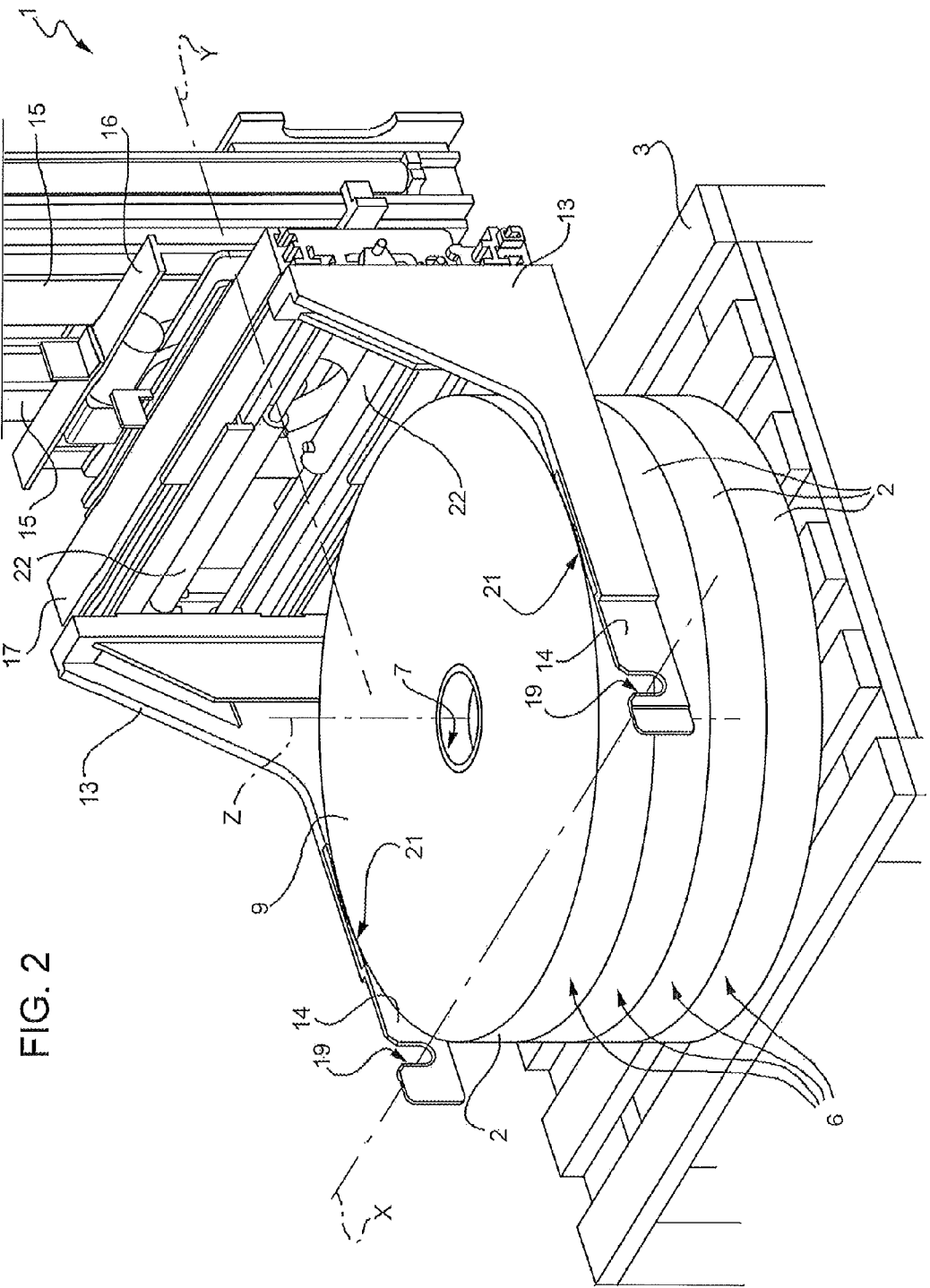
FIGS. 2 to 5 are perspective views of the clamping unit of FIG. 1 in respective operative positions.

Furthermore, reels 2 are stacked at storage station 3 preferably on a pallet and have their axes extending along a vertical direction (FIG. 2).

Differently, each reel 2 is fed to supply station 4 with the respective axis extending along a horizontal direction (FIG. 6).

With reference to FIG. 6, supply station 4 substantially comprises a frame 11 defining a compartment 12 into which reel 2 is fitted.

More precisely, reel 2 is supported within compartment 12 by a spindle 18 in a rotatable manner about its own axis.

In particular, spindle 18 (FIGS. 4 and 5) comprises a pair of cylindrical central portions 20 (only one of which is shown in FIG. 7) coaxially housed within hole 7 of reel 2 and a pair of cylindrical projections 23 extending on respective opposite sides of portions 20.

Each projection 23 has diameter lower than the diameter of portions 20 and comprises an annular groove 24 and an end 26 arranged on the opposite side of groove 24 with respect to corresponding portion 20.

Packaging unit 5 preferably produces sealed packages of a pourable food product, such as pasteurized or UHT milk, fruit juice, wine, etc.

Packaging unit 5 may also produce sealed packages of a food product which is pourable into tube when producing packages, and sets after packages are sealed. One example of such a food product is a portion of cheese, which is melted when producing packages, and sets after packages are sealed.

The packaging material has a multilayer structure (not shown) and comprises a layer of fibrous material, normally paper, covered on both sides with respective layers of heat-seal plastic material, e.g. polyethylene. In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of package eventually contacting the food product.

Tube is formed in known manner by longitudinally folding and sealing a web (not shown) of heat-seal sheet material, is filled by a fill pipe (not shown) with the sterilized or sterile-processed food product for packaging, and is fed, in known manner not shown, along a vertical path, is heat-sealed and cut at equally spaced cross sections.

Clamping unit 1 is preferably carried by a lift truck 8 which is shown in FIG. 6.

Clamping unit 1 advantageously comprises a pair of clamping arms 10 movable relatively to one another along a direction X (horizontal in FIGS. 1, 2, 6 and 7; and vertical in FIGS. 3 to 5) to any of: an open position in which they are detached from reel 2, a first clamping position (FIGS. 2 to 5) in which they are at first distance and cooperate with edge 6 of reel 2, and a second clamping position (FIG. 6) in which they are at second distance lower than said first distance and grip a spindle 18 engaging hole 7 of reel 2; clamping arms 10 are rotatable integrally to one another about a direction Y transversal to direction X.

In particular, the first distance equals the diameter of reel 2.

When clamping arms 10 are in the open position, they are at a third distance greater than the first distance.

Clamping arms 10 are substantially parallel. Furthermore, clamping arms 10 are movable integrally to one another along a direction Z vertical in use and transversal to both directions X, Y.

Direction Y, Z are fixed with respect to the movement of clamping arms 10 among open position, first clamping position and second clamping position.

Figure 3:
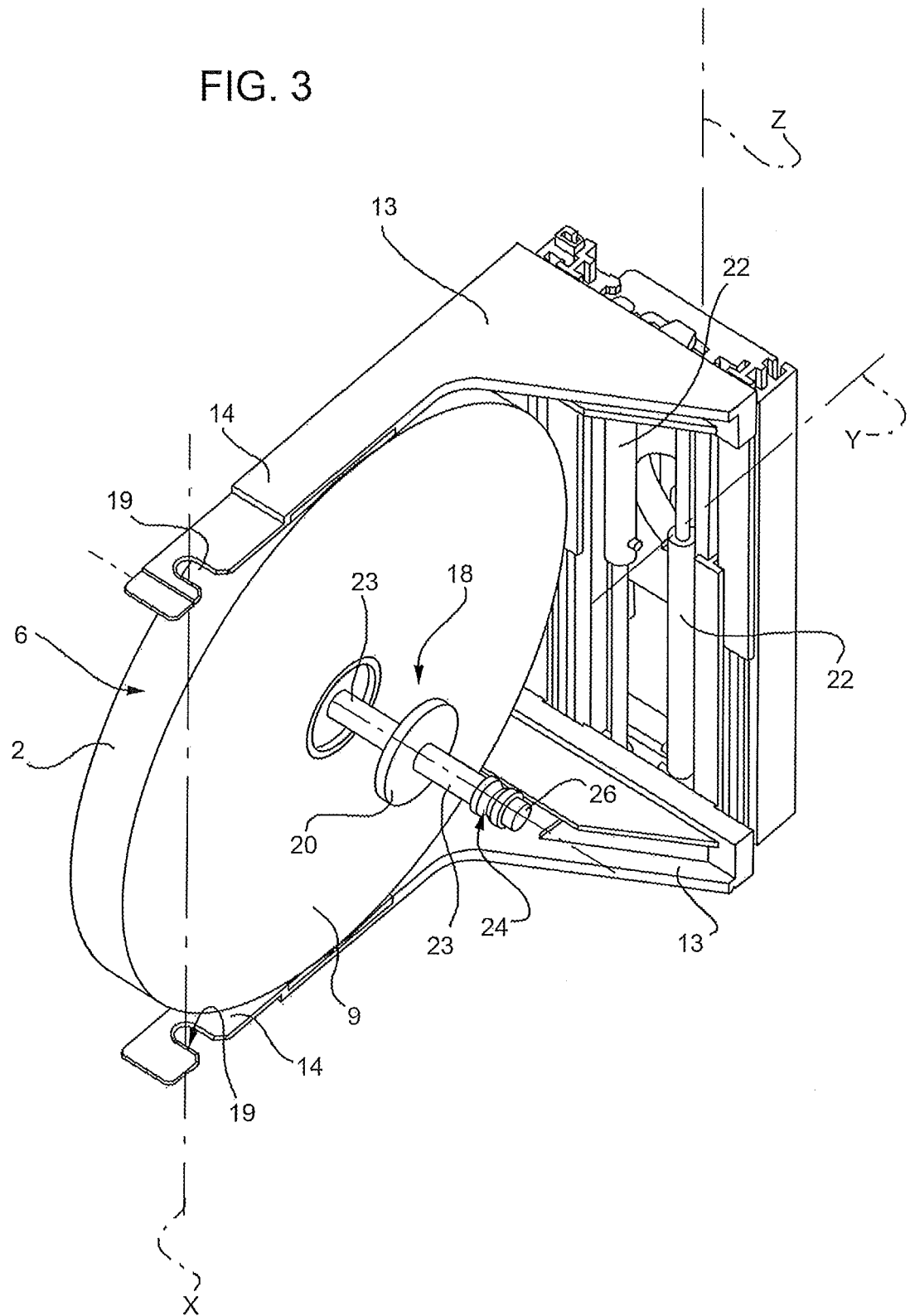
Figure 4:
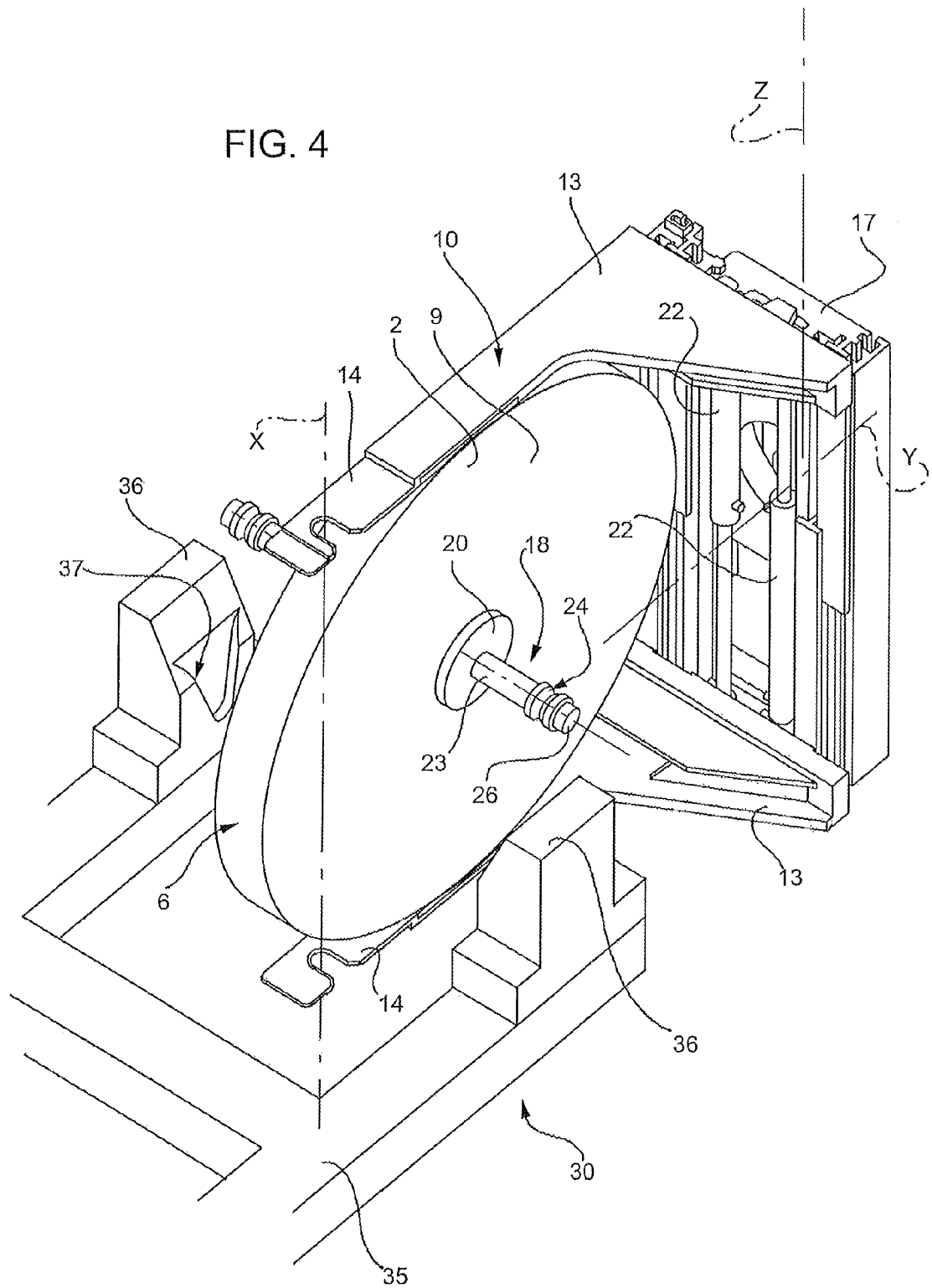
Figure 5:
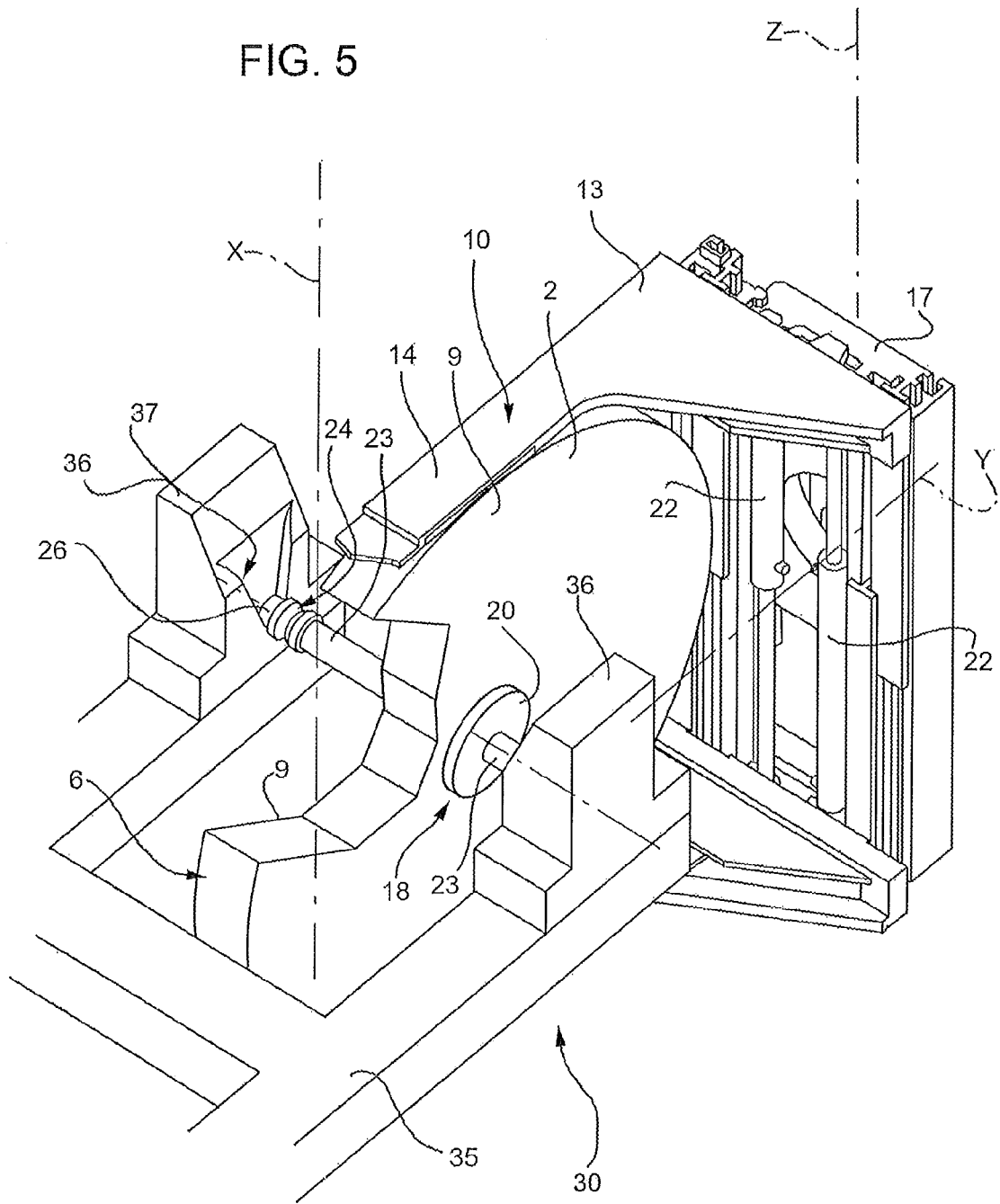

Direction X is integral with clamping arms 10 and is orthogonal to direction Y, Z when the axis of clamped reel 2 is horizontal (FIGS. 2 and 6); direction X is parallel to direction Z and orthogonal to direction Y when the axis of clamped reel 2 is vertical (FIGS. 3 to 5).

In greater detail, clamping unit 1 substantially comprises:
a pair of vertical guides 15 fitted to lift vehicle 8;
a slide 16 which may slide along direction Z onto guides 15;
a supporting table 17 which may rotate about direction Y with respect to slide 16 and protrudingly bears, on the opposite side of guides 15 and slide 16, clamping arms 10.

Each clamping arm 10 comprises a substantially trapezoidal portion 13 adjacent to table 17 and a free portion 14 opposed to trapezoidal portion 13 with respect to table 17.

Free portion 14 is substantially rectangular with a seat 19 configured to couple with a relative groove 24 of spindle 18. Preferably, seat 19 is through and U-shaped.

Free portion 14 of each clamping arm 10 also comprises an elastomeric pad 21 adapted to cooperate with edge 6 of reel 2.

In particular, pad 21 is located on the side of free portion 14 of each clamping arm 10 facing the other clamping arm 10.

Pad 21 of each clamping arm 10 is also arranged between respective trapezoidal portion 13 and respective seat 19 along direction Y.

Clamping unit 1 also comprises a pair of variable length actuators 22 arranged each between ends adjacent to table 17 of respective trapezoidal portions 11.

Actuators 22 substantially extend parallel to table 17 and orthogonal to clamping arms 10, and are operated to change the distance of clamping arms 10 along direction X.

More precisely, clamping arms 10 move away from one another along direction X when the length of actuators 22 is extended. Differently, clamping arms 10 approach one another along direction X when the length of actuators 22 is reduced.

The operation of clamping unit 1 will be hereinafter described starting from the configuration shown in FIG. 2, in which clamping unit 1 carried by lift truck 8 removes reel 2 from storage station 3.

More precisely, reels 2 are stored at storage station 3 with their own axes horizontal.

As clamping unit 1 removes reel 2 from storage station 3, clamping arms 10 are moved from open position to the first clamping position and cooperate with edge 6 of reel 2.

In this position, direction X is horizontal and orthogonal to directions Y, Z (FIG. 2).

Afterwards, clamping arms 10 are rotated integrally with one another and with reel 2 about axis Y for an angle of ninety degrees in a first sense. At the end of the rotation, the axis of reel 2 is horizontal and direction X is parallel to direction Z and orthogonal to direction Y. In other words, direction X is vertical.

At this stage, portions 20 are manually inserted within the hole 7 of reel 2 so that projections 23 extend on opposite sides of hole 7 (FIG. 3).

Clamping arms 10 are then lowered (FIG. 4) together with reel 2 along direction Z until reel 2 is supported by a stand 30 (FIG. 5).

More precisely, stand 30 substantially comprises a horizontal a base 35 and a pair of projections 36 projecting upwards from base 35. Projections 36 define respective grooves 37.

When reel 2 is supported by stand 30, grooves 37 are engaged by end 26 of spindle 18.

Clamping arms 10 are then moved to open position and are rotated about axis Y of ninety degrees relative to reel 2 in a second sense opposite to the first sense. At the end of the rotation, direction X is horizontal.

Furthermore, clamping arms 10 are moved to the second clamping position and seats 19 cooperate with grooves 24 of spindle 18.

Afterwards, clamping arms 10 are raised along direction Z and raise reel 2 together with spindle 18. Lift truck 8 moves reel 2 to supply station 4 of packaging unit 5 and is then inserted within compartment 12 (FIG. 6).

Finally, reel 2 is mounted together with spindle 18 on a support within compartment 12, clamping arms 10 are moved to the open position and lift truck 8 moves away from supply station 4.

The advantages of clamping unit 1 and of the method of moving a reel according to the present invention will be clear from the foregoing description.

In particular, clamping unit 1 uses same clamping arms 10 both for taking reel 2 from storage station 3 and for feeding supply station 4 with such reel 2.

As a consequence, the movement of reel 2 from storage station 3 to supply station 4 is highly streamlined.

Furthermore, as reel 2 is fed to supply station 4, spindle 18 is clamped by clamping arms 10 while edge 6 of reel 2 is not clamped.

Accordingly, there is substantially no risk of damaging the external layer of packaging material defining edge 6 during the insertion of reel 2.

Furthermore, due to the fact that spindle 18 is inserted within hole 7 of reel 2, the centering of reel 2 within the compartment 12 is favoured.

Finally, clamping unit 1 does not require the presence of a loading equipment to correctly arrange reel 2 within compartment 12.

Clearly, changes may be made to clamping unit 1 and of the method of moving a reel as described and illustrated herein without, however, departing from the scope of the present invention as defined in the accompanying claims.

The invention claimed is:

1. A method for moving a reel of packaging material from a storage station to a supply station of a packaging unit, comprising:
    clamping a peripheral edge of said reel by using a pair of clamping elements of a clamping unit;
    moving said clamping elements to an open position to release said reel;
    rotating said clamping elements relative to said reel;
    supporting said reel on said pair of clamping elements by interacting with a portion of said reel radially inner with respect to said peripheral edge; and
    inserting a spindle within a hole of said reel radially inner with respect to said peripheral edge, said inserting being carried out before the supporting of said reel by interacting with said portion, and said supporting of said reel by interacting with said portion comprising gripping said spindle by said clamping elements.

2. The method of claim 1, comprising supporting said reel on a stand after said step of clamping a peripheral edge of said reel and before said step of rotating said clamping elements.

3. The method of claim 1, comprising taking said reel from said storage station and feeding said supply station with said reel;
    said taking of said reel comprising clamping a circumferential edge; and
    said feeding being carried out with said reel supported by interacting with said portion.

4. The method of claim 1, wherein said inserting is carried out before supporting said reel on said stand.

5. The method of claim 1, wherein said inserting a spindle is carried out manually.

6. The method of claim 3, wherein said feeding of said supply station with said reel comprises feeding said supply station with said reel together with said spindle.

7. The method of claim 1, comprising rotating said clamping elements integrally with said reel after said clamping of said peripheral edge and before said rotating said clamping elements relative to said reel.

8. A clamping unit for clamping a reel of packaging material, comprising a pair of clamping elements movable relative to one another along a first direction between:
    an open position in which the clamping elements are detached from said reel;
    a first clamping position in which the clamping elements are at a first distance and clamp, in use, a peripheral edge of said reel; and
    a second clamping position in which the clamping elements are at a second distance lower than said first distance and support, in use, said reel by interacting with a portion radially inner with respect to said peripheral edge;
    said clamping elements being rotatable together as a unit about a second direction transversal to said first direction,
    each of said clamping element comprising:
        a first portion configured to cooperate with said peripheral edge of said reel in said first clamping position; and
        and a second portion defining a seat configured to be engaged by a spindle housed in a hole of said reel in said second clamping position, the seat being U-shaped with a curved bottom part.

9. The clamping unit of claim 8, wherein said clamping elements may slide integrally to one another along a third direction transversal to said second direction.

10. The clamping unit of claim 8, wherein said first portion comprises an elastomeric pad.

11. The clamping unit of claim 9 comprising:
    at least one guide;
    at least one slide movable with respect to said at least one guide along said third direction; and
    a support table rotatable with respect to said at least one slide about said second direction and supporting said clamping element in a movable manner with respect to said first direction.

12. A lift truck comprising the clamping unit of claim 8.

13. A clamping unit assembly for clamping a reel of packaging material, comprising:
    a supporting table rotatably mounted on a member to rotate about a first axis relative to the member;
    a first clamp and a second clamp coupled to the supporting table and rotatable together with the supporting table as a unit about the first axis relative to the member;
    a length actuator configured to vary a distance between the first clamp and the second clamp along a second axis transverse to the first axis; and
    a spindle comprising a central portion configured to be coaxially housed within a central hole of the reel, the spindle further comprising two cylindrical projections extending on respective opposite sides of the central portion,
    each of the first clamp and the second clamp comprising a seat that is dimensioned to accommodate one of the cylindrical projections of the spindle.

14. The clamping unit assembly of claim 13, wherein the member comprises a slide movable along a guide.

15. The clamping unit assembly of claim 14, wherein the guide is vertically oriented, and wherein the slide moves along a vertical direction.

16. The clamping unit assembly of claim 13, wherein each of the cylindrical projections of the spindle comprises an annular groove, the seat of each of the first clamp and the second clamp being dimensioned to be positioned in the annular groove of one of the cylindrical projections.

* * * * *